July 24, 1962   C. L. SHINN   3,046,388
WATER-PROOF TAIL LIGHT

Filed March 15, 1960   2 Sheets-Sheet 1

INVENTOR.
CLIFFORD L. SHINN
BY
ATTORNEY

July 24, 1962  C. L. SHINN  3,046,388
WATER-PROOF TAIL LIGHT

Filed March 15, 1960  2 Sheets-Sheet 2

INVENTOR.
CLIFFORD L. SHINN
BY
ATTORNEY

United States Patent Office 3,046,388
Patented July 24, 1962

3,046,388
WATER-PROOF TAIL LIGHT
Clifford L. Shinn, 320 Dyer Road, Santa Ana, Calif.
Filed Mar. 15, 1960, Ser. No. 15,164
1 Claim. (Cl. 240—8.3)

This invention relates to an improved water-proof tail light and has for one of its principal objects the provision of a device of the class described which can be particularly very satisfactorily employed in connection with boat trailers, the tail lights of which are often submerged during the boat launching operation.

It has been found that when the tail lights of boat trailers and similar vehicles are exposed to undue amounts of water, either by submersion or otherwise, short circuits result which usually makes the light bulb inoperative which, besides comprising an annoyance, is also quite a source of danger when the vehicle is being operated in traffic, especially at night.

One of the important objects of this invention is to provide a water-proof tail light which, while being particularly efficient, is also comparatively inexpensive in construction and proof against corrosion or damage by foreign particles.

Another object relates to the construction of such a tail light, wherein the light bulb can be readily removed and replaced whenever desired or necessary and also wherein the reflector element and related parts are so constructed as to provide a maximum of service at all times.

Yet another important object of this invention relates to the construcion of a tail light for boat trailers and other vehicles which can be permanently fixed in position and which need not be removed for boat launching or other similar operations.

Other and further important objects of the invention will be apparent from the disclosures in the accompanying drawings and following specification.

The invention, in a preferred form, is illustrated in the drawings and hereinafter more fully described.

Figure 1:
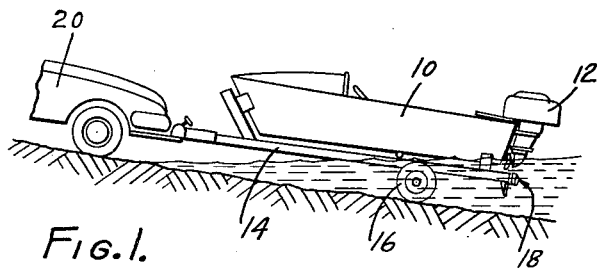
FIGURE 1 is a side elevation of a boat and trailer, showing the boat being launched by the operation of a towing vehicle.
Figure 2:
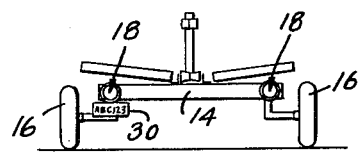
FIGURE 2 is a rear view of a representative type of boat trailer, illustrating improved water-proof tail lights of this invention mounted thereon.

The reference numeral 10 indicates generally a boat propelled by an outboard motor or the like 12 and placed, for purposes of transportation and launching, upon a trailer 14 having wheels 16 and tail lights 18 (FIGURE 2). The boat and trailer are ordinarily transported over land by means of a towing vehicle 20.

Figure 3:
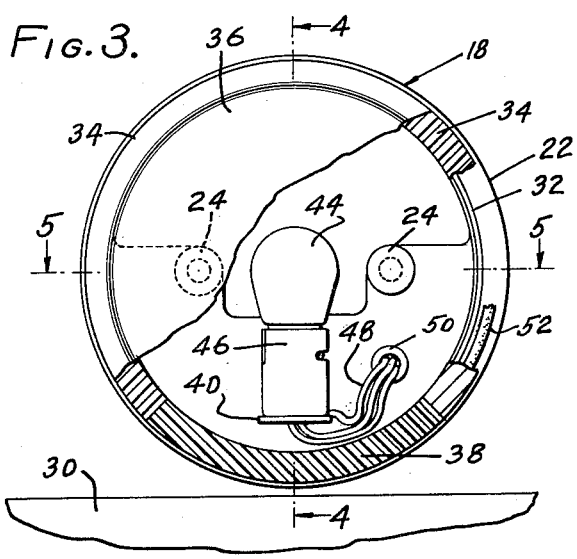
FIGURE 3 is an elevation, partly in section and parts broken away, showing one version of the improved water-proof tail light of this invention.
Figure 4:
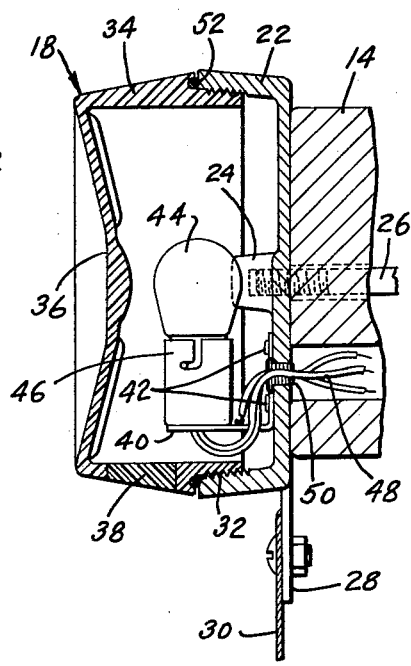
FIGURE 4 is a vertical section, taken on the plane of the line 4—4 of FIGURE 3, looking in the direction indicated by the arrows.
Figure 5:
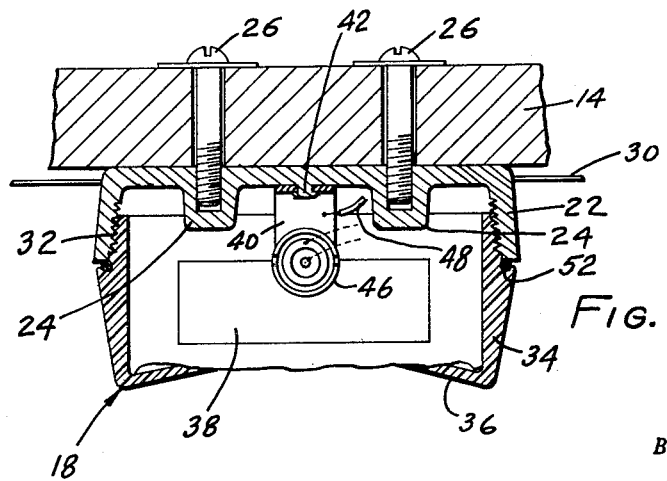
FIGURE 5 is a horizontal section on the line 5—5 of FIGURE 3, looking in the direction indicated.

One preferred type of the water-proof tail light of this invention is illustrated in FIGURES 3, 4 and 5, wherein the reference numeral 22 indicates a casing which can be composed of any opaque or otherwise suitable material, such as metal or plastic, and which is shaped as shown and includes a pair of integral bosses 24 internally screw threaded to receive the end of fastening bolts or the like 26 which pass through suitable openings in the frame 14 of the trailer, whereby the light itself can be securely fastened in position, usually just above the bracket 28 which supports the license plate 30 of the trailer, as required by law.

The case 22 is slightly flared, as best shown in FIGURE 4, and this flared portion is internally screw threaded at 32 for the reception of the externally screw-threaded corresponding portion of an outer-case element 34, which is also preferably composed of some moldable plastic, but which can be of other material. At least part of this outer case is translucent and of a red color so as to comply with all legal requirements for tail lights of this type. This red portion is preferably somewhat dished or concavo-convex, as shown at 36, and the portion of this case which, when assembled with the juxtaposed case portion 22 is downward, is composed of some clear translucent material 38, whereby the licence plate 30 is properly illuminated.

An angular bracket 40, usually of metal, is mounted inside the case 22 by some suitable fastening means 42, and this supports a conventional light bulb 44 with its socket 46.

Current-carrying wire 48 are led into the lamp through a sealed-in grommet or the like 50. An O-ring 52 or similar gasket element assures of a water-tight joint when the parts are assembled.

Figure 6:
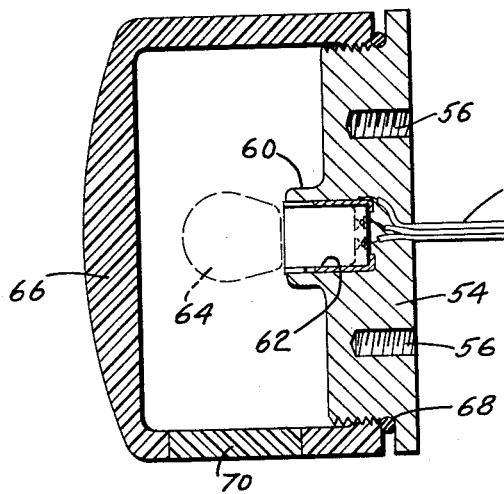
FIGURE 6 illustrates a modified form of the water-proof tail light of this invention and one which can be very economically produced.

Referring now to FIGURE 6, an alternate replaceable bulb type of water-proof tail light is shown and comprises essentially a base plate 54, having internally screw-threaded recesses 56 for the reception of fastening bolts and an opening for the passage of current-carrying wires 58. This base is preferably composed of some suitable plastic which can be readily molded and which, of course, possesses insulating qualities. The wires 58 can be actually molded into the base which includes a boss 60 internally recessed to support a receptacle 62 for a light bulb 64.

An exterior case 66, preferably of some translucent material in whole or in part, is formed and screw threaded so as to be readily affixed to the base 54 in an obvious manner, and an O-ring 68 is employed for rendering the case fluid tight. The lower portion 70 of the section 66 is of clear material for proper illumination of the license plate of the vehicle.

Figure 7:
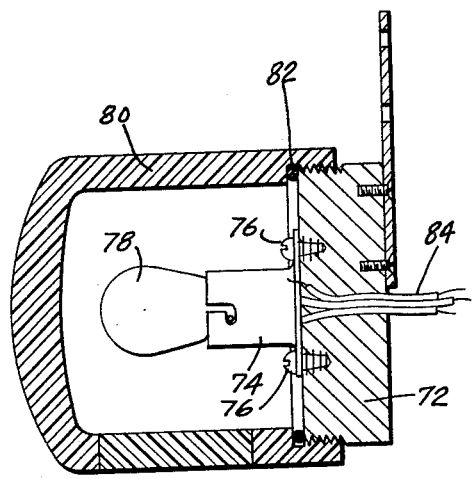
FIGURE 7 illustrates another modification of the invention and relates particularly to an alternative replaceable bulb type.

A somewhat additionally simplified version of the structure of FIGURE 6 is illustrated in FIGURE 7, wherein a base 72 has a lamp-holding plate and socket combination 74 fastened to its inner face by screws 76 for proper retention of a bulb 78, and an outer case 80 can be screw threaded onto the base 72 with the usual O-ring or other sealing means 82 in proper position. The current-carrying wires 84 can be brought into the case through an opening in the base 72 or they can be molded into the base.

Figure 8:
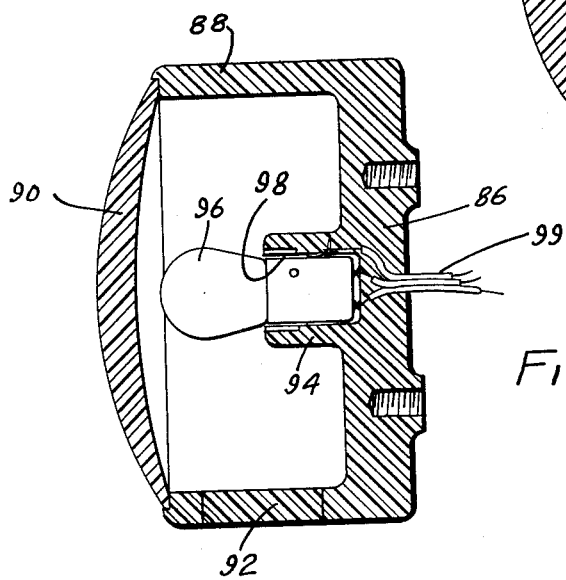
FIGURE 8 is another sectional view showing a disposable or throw-away type of water-proof tail light constructed in accordance with the principles of this invention.

A still more simplified and also a very economical further modified construction of this invention is depicted in FIGURE 8. This embodies a base 86, having integral flanges 88 forming a cylindrical housing. A transparent red lens 90 is heat sealed or otherwise permanently affixed to the outer edge of the flange 88, which flange has a clear portion 92. The base includes an integral boss 94 for the reception of a light bulb and socket combination 96—98, and the usual wires 99 are led in through the base 86 in any convenient manner.

The boat trailer tail lights of this invention may have many other applications and, in fact, are applicable whenever and wherever an explosion-proof, water-proof and foreign material-proof lighting fixture is employed. Corrosion or damage to the light bulb and socket or anything else inside the case is positively prevented, and the case can be so constructed as to conform with all requirements regarding light refraction and reflection.

Invariably, tail lights on boat trailers, after having been exposed to submersion, will become inoperative in a very short time. Removable tail lights are not practical and, in most cases, do not comply with municipal or other local ordinances. Furthermore, detachable lights, in addition to being expensive, are usually forgotten before being submerged, which ordinarily results in complete destruction or otherwise can be easily overlooked and not replaced when the trailer is used for hauling the boat overland. This, in addition to being illegal, invites accidents.

FIGURES 1 to 6 disclose replaceable bulb-type lamps which, in some cases, are more advantageous, but the structure of FIGURE 8 will appeal to many users as it is relatively inexpensive in any event, and its usable life is ordinarily such as will warrant complete disposal when replacement becomes necessary.

The lights of this invention can be made into all shapes and sizes and need not be restricted to vehicle tail lights, and many other uses will be obvious, such as underwater lighting, explosion and dust-proof lighting, aircraft running lights, rotating beacon lights and danger lights of all types for highways, airways and the like, whenever lights are exposed to the elements.

I am aware that many changes may be made and numerous details of construction varied throughout a wide range without departing from the principles of this invention; and I, therefore, do not propose limiting the patent granted hereon otherwise than as necessitated by the prior art.

I claim as my invention:

In a water-proof tail light construction for use in conjunction with submersive vehicles, the combination of: a casing of substantially cup-shaped configuration, said casing being provided with threads thereupon, said casing having a base incorporating a plurality of internal bosses incorporating screw threaded bores opening externally of said casing and adapted to receive mounting means therefor, said casing having an opening therein for the passage of electrical wires therethrough; a light bulb mounting socket secured entirely within said casing to the interior surface of said base below said bosses; a light bulb mounted in said socket; current carrying wires secured to said socket and extending through said opening in said base; sealing means in said wire receiving opening; an outer case element threadedly engaged upon the threads of said casing, said outer case being fabricated from translucent material and having a flange thereupon intermediate its extremities juxtaposed to the corresponding outer extremity of said case; and a gasket interposed between said flange and said extremity of said case to seal said case and outer case against the infiltration of fluid.

References Cited in the file of this patent

UNITED STATES PATENTS

| | | |
|---|---|---|
| 1,571,286 | Machesky | Feb. 2, 1926 |
| 1,588,522 | Browne | June 15, 1926 |
| 2,102,975 | Rolph | Dec. 21, 1937 |
| 2,107,648 | Putterman | Feb. 8, 1938 |
| 2,360,420 | Hill | Oct. 17, 1944 |
| 2,707,747 | De Frees | May 3, 1955 |
| 2,916,607 | Bargman | Dec. 8, 1959 |
| 2,970,209 | Glowzinski et al. | Jan. 31, 1961 |

FOREIGN PATENTS

| | | |
|---|---|---|
| 646,985 | Germany | June 24, 1937 |